United States Patent
Hsu et al.

(10) Patent No.: US 7,080,212 B1
(45) Date of Patent: Jul. 18, 2006

(54) CLOSED LOOP ADAPTIVE PRESTAGE METHOD, SYSTEM, AND PRODUCT FOR PRESTAGING CACHE BLOCKS

(75) Inventors: Shih-Li Hsu, Broomfield, CO (US); Amar Nath Sinha, Arvada, CO (US)

(73) Assignee: Storage Technology Corporation, Louisville, CO (US)

(*) Notice: Subject to any disclaimer, the term of this patent is extended or adjusted under 35 U.S.C. 154(b) by 325 days.

(21) Appl. No.: 10/750,101

(22) Filed: Dec. 29, 2003

(51) Int. Cl.
   *G06F 12/00* (2006.01)

(52) U.S. Cl. ...................... 711/137; 712/207

(58) Field of Classification Search .............. 711/137; 712/207, 233–237
See application file for complete search history.

(56) References Cited

U.S. PATENT DOCUMENTS 6,012,106 A * 1/2000 Schumann et al. ............ 710/22
6,253,289 B1 * 6/2001 Bates et al. .................. 711/137

FOREIGN PATENT DOCUMENTS

JP          2000076017       * 3/2000

* cited by examiner

*Primary Examiner*—Nasser Moazzami
(74) *Attorney, Agent, or Firm*—Yee & Associates, P.C.

(57) ABSTRACT

A method, system, and computer program product are disclosed for dynamically determining and adjusting a number of data blocks to be prestaged in a cache included in the storage device. The storage device receives and processes input/output (I/O) requests. Information about the I/O requests and about the processing of the requests by the storage device is accumulated. The information is then used to dynamically adjust a prestaging policy as the storage device receives and processes requests. The prestaging policy defines a current number of data blocks to be prestaged in the cache.

18 Claims, 2 Drawing Sheets

DATA PROCESSING SYSTEM 200

CLOSED LOOP ADAPTIVE PRESTAGE METHOD, SYSTEM, AND PRODUCT FOR PRESTAGING CACHE BLOCKS

BACKGROUND OF THE INVENTION

1. Technical Field

The present invention relates generally to the field of data processing systems, and more specifically to a closed loop adaptive prestage method, system, and computer program product for prestaging data in a cache in a storage device.

2. Description of Related Art

Disk input/output (I/O) devices typically include a controller which includes a cache. Using the controller cache more effectively can significantly improve the disk's I/O performance. The I/O performance is measured in terms of response time and other values which are the function of the cache hit percentage. The cache hit percentage is the percentage of time I/O requests found their requested data in the cache instead of having to retrieve it from the disk itself.

A sequential I/O request is defined as a request that requests data blocks that are addressed using successive, sequential logical addresses. These addresses appear to a user as being successive and sequential. The data blocks are logically addressed using a start address and then addresses obtained by adding 1 to the last address used.

Existing solutions to increasing the performance of a storage device prestages a set number of units. This number does not change over the course of time as additional I/O requests are received. Some solutions set this number based on instant I/O detection. The sequential detection method assumed that once data is accessed, the data will be accessed again within a short period of time, and the nearby memory locations are likely to be accessed as well.

None of the existing solutions provide a solid understanding of the ongoing I/O access pattern. The I/O access pattern is very unpredictable, particularly for application programs running a multiple thread environment. In such an environment, when every thread goes through several execution phases, the interaction among threads causes the I/O access pattern to change as I/O requests are processed.

Therefore, a need exists for a closed-loop adaptive prestage method, system, and product that can self-monitor the I/O access pattern, statistically characterize I/O references, and configure the system resources to use a proper throttle method and estimation theory.

SUMMARY OF THE INVENTION

A method, system, and computer program product are disclosed for dynamically determining and adjusting a number of data blocks to be prestaged in a cache included in a storage device. The storage device receives and processes input/output (I/O) requests. Information about the I/O requests and about the processing of the requests by the storage device is accumulated. The information is then used to dynamically adjust a prestaging policy as the storage device receives and processes requests. The prestaging policy defines a current number of data blocks to be prestaged in the cache.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
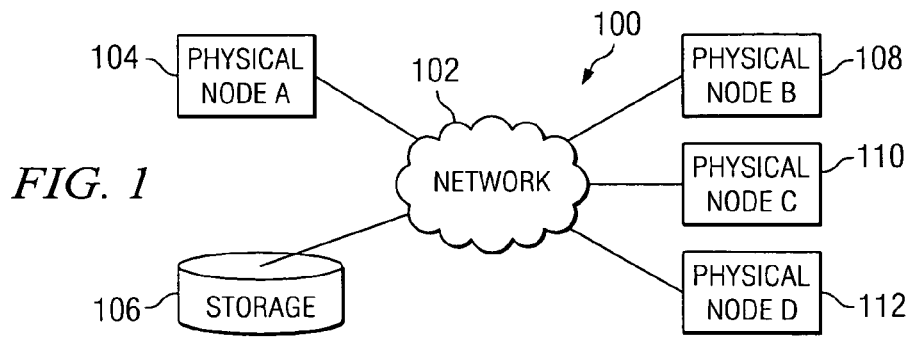
FIG. 1 depicts a pictorial representation of a data processing system that is a distributed storage environment that includes multiple physical nodes in which the present invention may be implemented in accordance with the present invention.

A preferred embodiment of the present invention and its advantages are better understood by referring to the figures, like numerals being used for like and corresponding parts of the accompanying figures.

The present invention is a method, system, and computer program product for dynamically determining and adjusting a number of data blocks to be prestaged in a cache that is included in a storage device. According to the present invention, in order to manage cache data prestaging for each volume in a storage drive more effectively, the drive's controller will keep track of the following information for each volume: (1) statistics regarding sequential I/O request characteristics, such as I/O rate, number of blocks per I/O request, and locality reference of nearby I/O location, (2) number of base prestaging units, such as tracks, records, or clusters requested for prestaging, and (3) percentage of prestage units which has been referenced. The locality reference of nearby I/O location information uses the starting block address of the current I/O request and the ending block address of the last I/O request for the volume to determine whether or not the current I/O request is contiguous to the last I/O request.

Although the present invention is preferably implemented in a system that employs a redundant array of independent disks (RAID), it may be implemented in any storage drive system.

When the controller receives a sequential I/O request for the first time for a volume, the controller will accumulate the number of logical sequential blocks from a user's perspective per volume that the host has requested. The controller then converts the number of sequential blocks requested per volume into the number of requested base staging units per drive for multiple drives in a redundant group. In a RAID system, the sequential blocks on a volume will be striped across the backend physical drives based on the stripe depth per drive and the number of drives in a redundant group. Therefore, the RAID controller needs to convert the number of blocks per volume into the number of physical blocks per drive. A request of the number of physical blocks per drive is sent to all drives in the associated redundant group.

The controller keeps track of the number of requested logical base staging units for each request as part of the statistics of sequential I/O characteristics along with a record of a stream of sequential I/O memory locations that have been issued to this volume. The record of a stream of sequential I/O memory locations that have been issued to this volume was used to determine the number of contiguous sequential I/Os on the read and to accumulate the number of blocks requested by the I/O requests. When the controller receives the second and third sequential I/O requests, the controller continues to accumulate statistics in order to characterize the sequential I/O request pattern to build a prestaging policy.

When the host issues subsequent contiguous sequential I/O requests for this user volume, the controller will calculate the average number of logically addressed base staging units that were accessed by the host. This average value is written into a "raw prestage" counter which is stored in the storage device's non-volatile memory. The shared memory is a nonvolatile memory that is included in the drive. The number in this counter is referred to herein as the "raw prestage count". This raw prestage count will be used to estimate the number of base staging units that need to be prestaged from the drive to the cache for subsequent sequential I/O requests. The controller will continue tracking the number of base staging units that were actually accessed by the host. A sequential I/O counter exists for each volume that keeps track of the total number of contiguous sequential I/O requests for the volume. The sequential I/O counter for that volume will be incremented.

When the host accesses any of the prestaged blocks, also called logical base units herein, the controller will monitor the percentage of the prestaged units that were actually referenced before being flushed out of the cache. The number of prestaged units that were actually referenced is referred to herein as the number of referenced prestaged units. When the number of referenced prestaged units is high, it suggests that the host accessed most of the blocks from the cache because the prestaging policy is effective. When the percentage is low, it suggests that the prestaging policy should be reassessed.

An adjusted prestage count is determined by multiplying the raw prestage count by the number of referenced prestage units.

Before the prestage request is issued to a drive in a redundant group, the controller will determine the current usage of the drives in that redundant group. The drive usage is measured by multiplying the drive I/O arrival rate with the average service time processed on the drive. When the drive utilization is below or at 60%, the drive utilization is considered stable. When the drive is stable, the drive has the capability to accept and process prestage requests. When the drive is considered stable, prestaging requests will progress normally without throttling.

When the drive utilization is between 60% and 80%, the drive utilization is considered critical. When the drive utilization is critical, the present invention will start throttling the number of blocks to be prestaged.

When the drive utilization is at or over 80%, the drive utilization is unstable. No prestaging requests will be issued to the drives while the drive utilization is unstable. Prestage requests will resume when the drive utilization again becomes either critical or stable.

The present invention calculates a throttle prestage count. The throttle prestage count is calculated using the following formula:

$$(\text{adjusted prestage count}) * [2 - (\text{drive utilization precentage}/0.6)].$$

The throttle prestage count is then used as the current number of units to be prestaged for each I/O request.

The present invention provides for throttling the number of data units to be prestaged according to a prestage policy that is dynamically adjusted according to the changing characteristics of the sequential I/O requests and the drive utilization. The present invention is a closed loop approach because the number of blocks to be prestaged is adjusted dynamically in response to the changing I/O request pattern and drive utilization conditions and requires no user input or adjustment to maintain a high level of controller cache performance. The prestaging activities are revised as the drive usage increases in order to prevent unnecessary throttling of the number of units to be prestaged while maintaining overall activities below the saturation point. This significantly improves the I/O performance of the storage drive by achieving a higher cache-hit percentage.

All counts described herein, such as the raw prestage count, the adjusted prestage count, the throttle prestage count, and the sequential I/O counters are stored in counters in the shared memory of the storage device.

FIG. 1 depicts a pictorial representation of a data processing system 100 that is a distributed storage environment that includes multiple physical nodes in accordance with the present invention. Data processing system 100 contains a network 102, which is the medium used to provide communications links between various devices and computers connected together within data processing system 100. Network 102 may include connections, such as wire, wireless communication links, or fiber optic cables.

In the depicted example, multiple physical nodes 104, 108, 110, and 112 are connected to network 102 along with storage unit 106. Network 102 may include permanent connections, such as wire or fiber optic cables, or temporary connections made through telephone connections. The communications network 102 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology.

Physical nodes 104, 108, 110, and 112 may be, for example, storage systems such as tape drives and disk drives, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

FIG. 1 is intended as an example, and not as an architectural limitation for the present invention.

Figure 2:
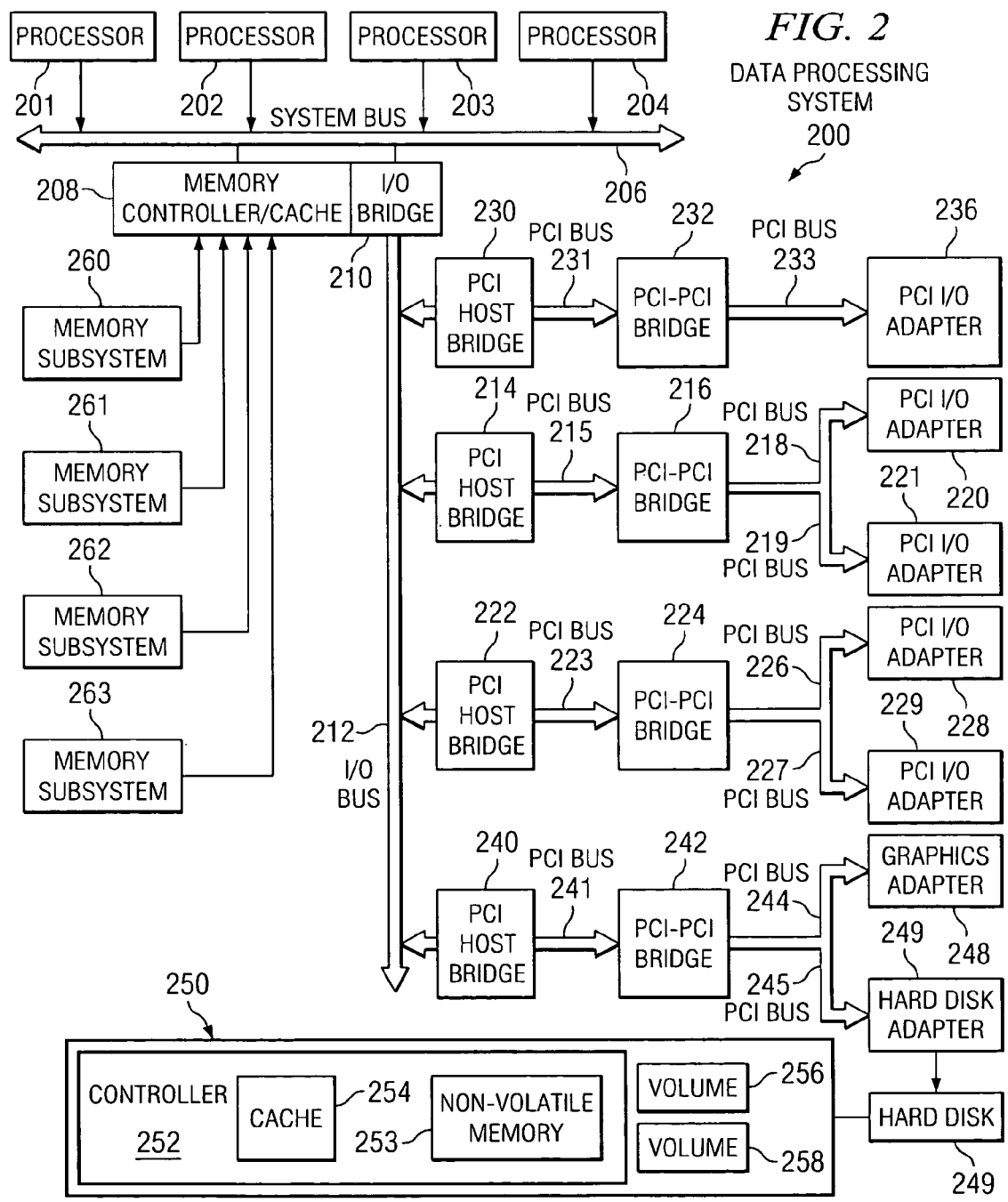
FIG. 2 is a detailed block diagram of a computer system that may be used to implement one or more of the nodes of FIG. 1 in accordance with the present invention.

FIG. 2 illustrates a detailed block diagram of a computer system that includes the present invention in accordance with the present invention. Computer system 200 may be a symmetric multiprocessor (SMP) system including a plurality of processors 201, 202, 203, and 204 connected to system bus 206. Alternatively, a single processor system may be employed. Also connected to system bus 206 is memory controller/cache 208, which provides an interface to a plurality of memory subsystems 260–263. I/O bus bridge 210 is connected to system bus 206 and provides an interface to I/O bus 212. Memory controller/cache 208 and I/O bus bridge 210 may be integrated as depicted.

As used herein, a memory subsystem includes a memory card to which are attached physical memory modules such as DIMMs. A memory card also includes one or more buffers as described herein which may act as virtual DIMMs. Each buffer is assigned a unique identifier and is coupled to the data and address buses of the memory card.

Data processing system 200 may be a logically partitioned data processing system. Thus, data processing system 200 may have multiple heterogeneous operating systems (or multiple instances of a single operating system) running simultaneously. Each of these multiple operating systems may have any number of software programs executing within it. Data processing system 200 may be logically partitioned such that different I/O adapters 220–221, 228–229, 236, and 248–249 may be assigned to different logical partitions.

Peripheral component interconnect (PCI) Host bridge 214 connected to I/O bus 212 provides an interface to PCI local bus 215. A number of Input/Output adapters 220–221 may be connected to PCI bus 215 through PCI to PCI bridge 216. Typical PCI bus implementations will support between four and eight I/O adapters (i.e. expansion slots for add-in connectors). Each I/O Adapter 220–221 provides an interface between data processing system 200 and input/output devices such as, for example, other network computers, which are clients to data processing system 200.

PCI host bridge 230 provides an interface for PCI bus 231 which is connected to PCI-PCI bridge 232. PCI-PCI bridge 232 is coupled to a PCI I/O adapter 236 through PCI bus 233.

An additional PCI host bridge 222 provides an interface for an additional PCI bus 223. PCI bus 223 is connected to a plurality of PCI I/O adapters 228–229 through a PCI-PCI bridge 224 and PCI bus 226–227. Thus, additional I/O devices, such as, for example, modems or network adapters may be supported through each of PCI I/O adapters 228–229. In this manner, data processing system 200 allows connections to multiple network computers.

A memory mapped graphics adapter 248 may be connected to I/O bus 212 through PCI Host Bridge 240 and PCI-PCI bridge 242 via PCI buses 241, 244 and 245 as depicted.

A storage device 250, such as a hard disk drive or a tape drive, may also be connected to I/O bus 212 through PCI Host Bridge 240 and PCI-PCI bridge 242 via PCI buses 241 and 245 as depicted. Storage device 250 includes a controller 252, non-volatile memory 253, a cache 254, and volumes 256 and 258. Controller 252 receives and processes requests to access volumes 256, 258. Controller 252 also uses cache 254 to prestage data blocks. Thus, data blocks are retrieved from one or more volumes of storage device 250 and prestaged by being stored in cache 254 for later use.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
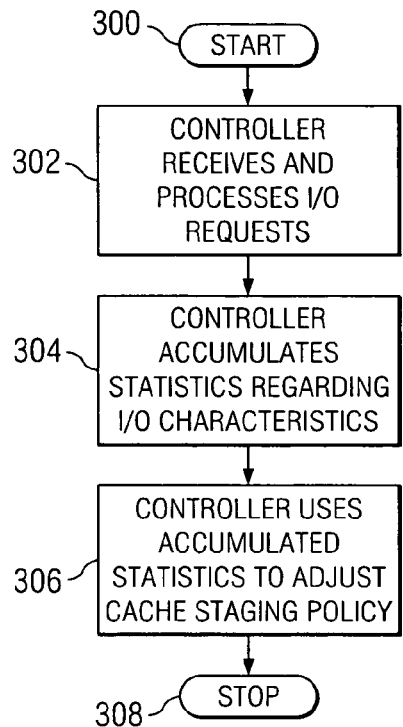
FIG. 3 depicts a high level flow chart that illustrates a storage device controller using accumulated I/O statistics to dynamically adjust a cache prestaging policy associated with a volume of the storage device as I/O requests are processed in accordance with the present invention.

FIG. 3 depicts a high level flow chart that illustrates a storage device controller using accumulated I/O statistics to adjust a cache prestaging policy associated with a volume of the storage device in accordance with the present invention. The process starts as depicted by block 300 and thereafter passes to block 302 which illustrates a controller included in a storage device receiving and processing I/O requests to access one or more volumes included in the storage device. A cache prestaging policy is implemented as the requests are processed.

Next, block 304 depicts the controller accumulating statistics regarding the characteristics of each I/O request as that request is processed by the storage device. As each I/O request is received, many different kinds of information are determined. The information includes I/O rate, the I/O length, access pattern, characteristics regarding the workload requested such as whether it is contiguous, sequential, random, and a read/write ratio volume base. Other information includes the number of sequential blocks requested, the number of contiguous sequential I/O requests, and the locality reference of nearby sequential I/O locations.

Block 306, then, illustrates the controller using the accumulated statistics to adjust the cache prestaging policy. The process then terminates as depicted by block 308.

Figure 4:
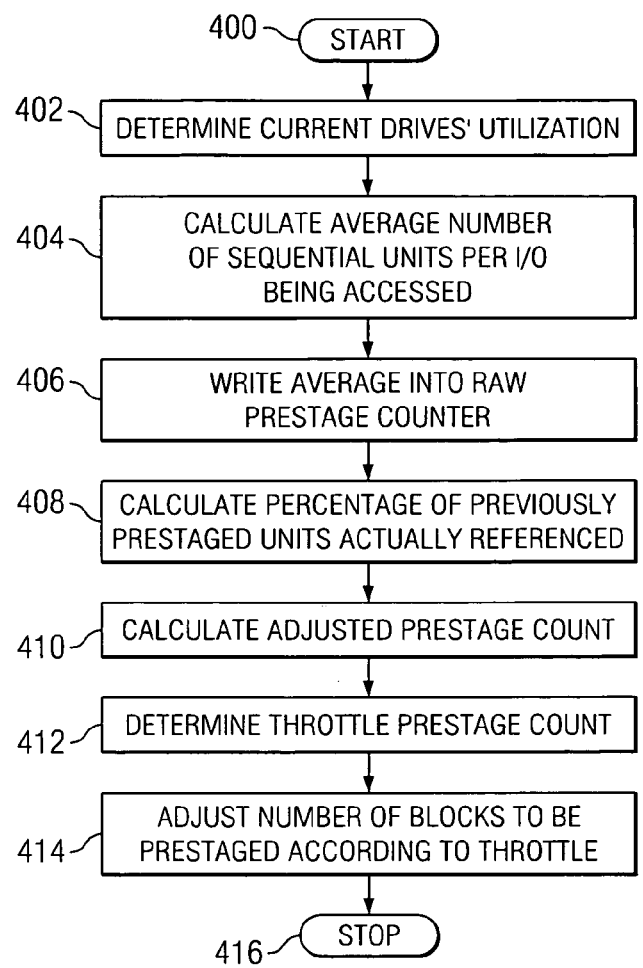
FIG. 4 illustrates a high level flow chart that depicts using I/O statistics to determine an optimum number of memory blocks to be prestaged in accordance with the present invention.

FIG. 4 illustrates a high level flow chart that depicts using I/O statistics to determine an optimum number of memory blocks to be prestaged in accordance with the present invention. The process starts as depicted by block 400 and thereafter passes to block 402 which illustrates determining the storage drive's current utilization. The drive's utilization is determined by multiplying the I/O arrival rate for the drive with the average time taken by the drive for processing each I/O request.

Next, block 404 depicts calculating the average number of sequential units per I/O request being accessed. As sequential I/O requests are received, the number of sequential blocks requested by each request is accumulated. An average is constantly maintained and updated as subsequent sequential I/O requests are received.

The process then passes to block 406 which illustrates writing this average into a "raw prestage" counter. The value in the counter is updated after each I/O request. Block 408, then, depicts calculating the percentage of previously prestaged units that have actually been referenced. Thereafter, block 410 illustrates calculating an adjusted prestage count. The adjusted prestage count is calculated by multiplying the value that is currently stored in the raw prestage counter by the percentage of previously prestaged units that were actually referenced.

Next, block 412 depicts determining a throttle prestage count. The throttle prestage count is calculated using the following formula: (adjusted prestage count)*[2−(request drive utilization/0.6)]. Block 414, then, illustrates adjusting the number of blocks to be prestaged according to the throttle prestage count. The number of blocks to be prestaged is the throttle prestage count. The process then terminates as depicted by block 416.

Figure 5:
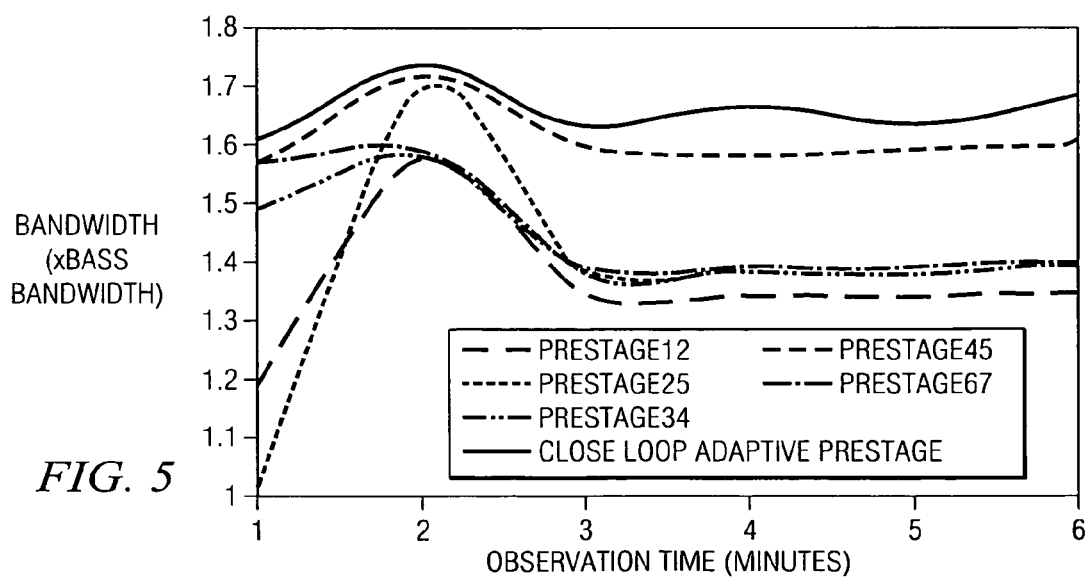
FIG. 5 is a graphical depiction of an improvement of the present invention over the prior art in accordance with the present invention.

FIG. 5 is a graphical depiction of an improvement of the present invention over the prior art in accordance with the present invention. The present invention consistently improved storage device sequential I/O bandwidth by more than 20% as shown in FIG. 5. Development time is reduced because there is no need for a user to try and determine a best fit prestage policy for an environment that is constantly changing. The present dynamically determines the best prestage policy for a particular storage drive as I/O requests are processed and adjusts the policy accordingly.

Several different prestage policies are depicted. For example, prestage 12 is a method that uses a predetermined prestage policy. Thus, the number of blocks to be prestaged is set according to the policy and does not change dynamically in response to changing I/O patterns. The prestage 12 policy prestages one track after the first sequential I/O detection and then prestages two tracks for the remaining sequential I/Os after the receiving I/O request is detected as a sequential I/O request. The prestage 25 prestages two tracks after the first sequential I/O detection and then prestages five tracks for the remaining sequential I/Os after the receiving I/O request is detected as a sequential I/O request. The other depicted prestage policies operate in a manner similar to the prestage 12 and prestage 25 policies.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a storage device for dynamically determining and adjusting a number of data blocks to be prestaged in a cache included in said storage device, said method comprising the steps of:
   receiving and processing a plurality of input/output (I/O) requests by said storage device;
   accumulating information about said plurality of I/O requests and said processing of future I/O requests by said storage device;
   utilizing said accumulated information to dynamically adjust a prestaging policy as said storage device receives and processes said plurality of requests, said prestaging policy defining a current number of data blocks to be prestaged in said cache; and
   wherein said accumulating information further includes determining an average number of contiguous sequential blocks accessed for each one of said plurality of I/O requests.

2. The method according to claim 1, wherein said receiving and processing a plurality of input/output (I/O) requests by said storage device further comprises receiving and processing a plurality of contiguous, sequential input/output (I/O) requests by said storage device.

3. The method according to claim 1, wherein said accumulating information further includes;
   determining a percentage of previously prestaged data blocks that were actually referenced.

4. The method according to claim 1, wherein said accumulating information further includes:
   determining a current utilization of said storage device.

5. The method according to claim 1, further comprising:
   determining a percentage of previously prestaged data blocks that were actually referenced;
   determining an adjusted prestage count utilizing said determined average number and said percentage of previously prestaged data blocks that were actually referenced; and
   utilizing said adjusted prestage count to dynamically adjust said prestaging policy.

6. The method according to claim 5, further comprising:
   determining said adjusted prestage count by multiplying said average number by said percentage of previously prestaged data block that were actually referenced.

7. The method according to claim 5, further comprising:
   determining a current utilization of said storage device;
   dynamically adjusting said prestaging policy by determining a new number of data blocks to be prestaged utilizing said current utilization and said adjusted prestage count.

8. The method according to claim 7, wherein said determining said new number of data blocks further comprises:
   determining a percentage of time said storage device is being utilized;
   converting said percentage into a fraction; and
   determining said new number of data blocks by:
      dividing said fraction by 0.6 to produce a first result;
      subtracting said first result from 2 to produce a second result; and
      multiplying said adjusted prestage count by said second result to produce said new number of data blocks.

9. A data processing system including a storage device for dynamically determining and adjusting a number of data blocks to be prestaged in a cache included in said storage device, said system comprising:
   said system including a CPU executing code for receiving and processing a plurality of input/output (I/O) requests by said storage device;
   said CPU executing code for accumulating information about said plurality of I/O requests and said processing of said plurality of I/O requests by said storage device;
   said CPU executing code for utilizing said accumulated information to dynamically adjust a prestaging policy as said storage device receives and processes future I/O requests, said prestaging policy defining a current number of data blocks to be prestaged in said cache; and
   wherein said CPU executing code for accumulate information further includes said CPU executing code for determining an average number of contiguous sequential blocks accessed for each one of said plurality of I/O requests.

10. The system according to claim 9, wherein said CPU executing code for receiving and processing a plurality of input/output (I/O) requests by said storage device further comprises said CPU executing code for receiving and processing a plurality of contiguous, sequential input/output (I/O) requests by said storage device.

11. The system according to claim 9, wherein said CPU executing code for accumulating information further includes:
   said CPU executing code f& determining a percentage of previously prestaged data blocks that were actually referenced.

12. The system according to claim 9, wherein said CPU executing code for accumulating information further includes:
   said CPU executing code for determining a current utilization of said storage device.

13. The system according to claim 9, further comprising:
said CPU executing code for determining a percentage of previously prestaged data blocks that were actually referenced;
said CPU executing code for determining an adjusted prestage count utilizing said determined average number and said percentage of previously prestage data blocks that were actually referenced; and
said CPU executing code for utilizing said adjusted prestage count to dynamically adjust said prestaging policy.

14. The system according to claim 13, further comprising:
said CPU executing code for determining said adjusted prestage count by multiplying said average number by said percentage of previously prestaged data block that were actually referenced.

15. The system according to claim 13, further comprising:
said CPU executing code for determining a current utilization of said storage device; and
said CPU executing code for dynamically adjusting said prestaging policy by determining a new number of data blocks to be prestaged utilizing said current utilization and said adjusted prestage count.

16. The system according to claim 15, wherein said CPU executing code for determining said new number of data blocks further comprises:
said CPU executing code for determining a percentage of time said storage device is being utilized;
said CPU executing code for converting said percentage into a fraction; and
said CPU executing code for determining said new number of data blocks by:
dividing said fraction by 0.6 to produce a first result;
subtracting said first result from 2 to produce a second result; and
multiplying said adjusted prestage count by said second result to produce said new number of data blocks.

17. A computer program product for dynamically determining and adjusting a number of data blocks to be prestaged in a cache included in a storage device, said product comprising:
instruction means for receiving and processing a plurality of input/output (I/O) requests by said storage device;
instruction means for accumulating information about said plurality of I/O requests and said processing of said plurality of I/O requests by said storage device;
instruction means for utilizing said accumulated information to dynamically adjust a prestaging policy as said storage device receives and processes further I/O requests, said prestaging policy defining a current number of data blocks to be prestaged in said cache; and
wherein said instruction means for accumulating information further includes instruction means for determining an average number of contiguous sequential blocks accessed for each one of said plurality of I/O requests.

18. The product according to claim 17, further comprising:
instruction means for determining a percentage of previously prestaged data blocks that were actually referenced;
instruction means for determining an adjusted prestage count utilizing said determined average number and said percentage of previously prestaged data blocks that were actually referenced; and
instruction means for utilizing said adjusted prestage count to dynamically adjust said prestaging policy.

* * * * *